US012715045B2

(12) United States Patent
Yamamoto

(10) Patent No.: US 12,715,045 B2
(45) Date of Patent: Aug. 25, 2026

(54) HOLDER, CUTTING TOOL, AND METHOD FOR MANUFACTURING MACHINED PRODUCT

(71) Applicant: KYOCERA CORPORATION, Kyoto (JP)

(72) Inventor: Keisuke Yamamoto, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 624 days.

(21) Appl. No.: 18/249,737

(22) PCT Filed: Oct. 21, 2021

(86) PCT No.: PCT/JP2021/038920
§ 371 (c)(1),
(2) Date: Apr. 20, 2023

(87) PCT Pub. No.: WO2022/085760
PCT Pub. Date: Apr. 28, 2022

(65) Prior Publication Data

US 2023/0381869 A1 Nov. 30, 2023

(30) Foreign Application Priority Data

Oct. 22, 2020 (JP) ................................ 2020-177172

(51) Int. Cl.
*B23B 27/10* (2006.01)
*B23B 1/00* (2006.01)
(Continued)

(52) U.S. Cl.
CPC ............ *B23B 27/1603* (2013.01); *B23B 1/00* (2013.01); *B23B 27/10* (2013.01); *B23B 27/04* (2013.01)

(58) Field of Classification Search
CPC ........... B23B 1/00; B23B 27/04; B23B 27/10; B23B 27/141; B23B 27/086; B23B 27/1666; B23B 27/08; B23B 29/043
See application file for complete search history.

(56) References Cited

U.S. PATENT DOCUMENTS 4,072,438 A * 2/1978 Powers ................ B23B 27/007 408/239 R
6,299,388 B1 * 10/2001 Slabe ..................... B23B 27/10 407/100
(Continued)

FOREIGN PATENT DOCUMENTS

CN 111618323 A * 9/2020 ............ B23B 27/10
CN 211539515 U * 9/2020
(Continued)

*Primary Examiner* — Nicole N Ramos
(74) *Attorney, Agent, or Firm* — HAUPTMAN HAM, LLP

(57) ABSTRACT

A holder may include a first end surface, a first lateral surface extending from the first end surface, a pocket which opens into the first end surface and the first lateral surface, a main coolant hole, a first sub coolant hole connecting to the main coolant hole, and a second sub coolant hole connecting to the main coolant hole. The first sub coolant hole may include a first opening that opens into the first lateral surface. The second sub coolant hole may include a second opening that opens into the first lateral surface. A width of the first opening in a direction along a central axis may be smaller than a width of the second opening in the direction along the central axis.

14 Claims, 10 Drawing Sheets

(51) Int. Cl.

| | |
|---|---|
| ***B23B 27/16*** | (2006.01) |
| *B23B 27/04* | (2006.01) |

(56) References Cited

U.S. PATENT DOCUMENTS

| | | | | |
|---|---|---|---|---|
| 9,346,103 | B2 * | 5/2016 | Luik | B23B 27/10 |
| 10,029,312 | B2 * | 7/2018 | Thelin | B23B 27/10 |
| 11,059,104 | B2 * | 7/2021 | Kobayashi | B23C 5/28 |
| 2013/0129428 | A1 * | 5/2013 | Henry | B23D 15/14<br>407/11 |
| 2016/0236281 | A1 * | 8/2016 | Kitagawa | B23C 5/28 |
| 2019/0015904 | A1 * | 1/2019 | Kobayashi | B23B 27/10 |
| 2019/0030612 | A1 * | 1/2019 | Larsson | B23B 27/10 |
| 2020/0230704 | A1 | 7/2020 | Ando | |

FOREIGN PATENT DOCUMENTS

| | | | |
|---|---|---|---|
| JP | 201925603 | A | 2/2019 |
| WO | 2019069924 | A1 | 4/2019 |

* cited by examiner

HOLDER, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2021/038920 filed on Oct. 21, 2021, which claims priority to Japanese Patent Application No. 2020-177172, filed Oct. 22, 2020. The contents of this application are incorporated herein by reference in their entirety.

TECHNICAL FIELD

The present disclosure may generally relate to a holder and a cutting tool used in a machining process of a workpiece, and a method for manufacturing a machined product. More specifically, the present disclosure may relate to a cutting tool used in a turning process. Examples of the turning process may include internal machining, external machining, grooving process, cutting-off process, and end face machining.

BACKGROUND

For example, a cutting tool is discussed in Japanese Unexamined Patent Publication No. 2019-025603 (Patent Document 1) as a cutting tool used in a machining process of a workpiece such as metal. The cutting tool discussed in Patent Document 1 may include a tool body (holder) having a quadrangular prism shape. The holder ay include a fluid flow path located therein, and a fluid supply port located on a lateral surface, and the holder is attached to a turret. The turret may include an opening for a flow path that permits a flow of a fluid. The fluid supply port of the holder may connect to the opening of the turret.

A projection amount of the cutting tool from the turret may change depending on machining conditions in a machining process of a workpiece. It may be desired that the fluid can be stably supplied to the holder even if the projection amount changes. In other words, it may be desired to maintain a high degree of setting for the projection amount while supplying the fluid to the holder.

SUMMARY

A holder in a non-limiting embodiment of the present disclosure may have a bar shape extending from a first end to a second end along a central axis. The holder may include a first end surface located on the first end, a first lateral surface extending from the first end surface toward the second end, a pocket which opens into the first end surface and the first lateral surface and which permits attachment of a cutting insert, a main coolant hole extending from a side of the first end toward a side of the second end, a first sub coolant hole connecting to the main coolant hole, and a second sub coolant hole which is located closer to the second end than the first sub coolant hole and which connects to the main coolant hole.

The first sub coolant hole may include a first opening that opens into the first lateral surface. The second sub coolant hole may include a second opening that opens into the first lateral surface. A width of the first opening in a direction along the central axis may be smaller than a width of the second opening in the direction along the central axis.

EMBODIMENTS

Holders

Figure 1:
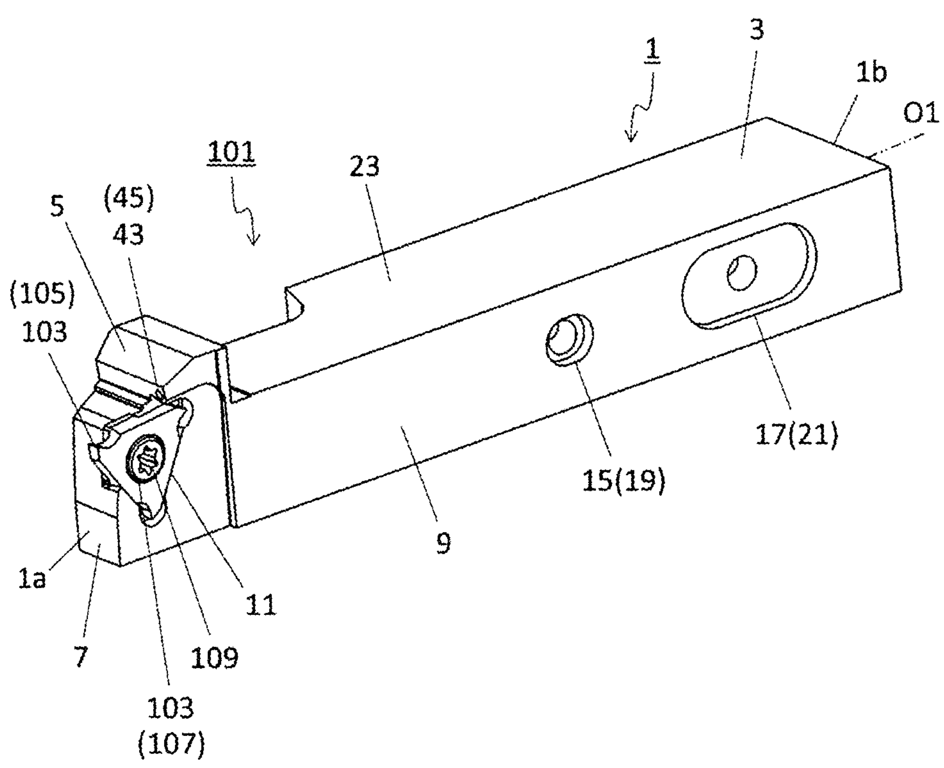
FIG. 1 is a perspective view illustrating a holder (cutting tool) in a non-limiting embodiment of the present disclosure.
Figure 2:
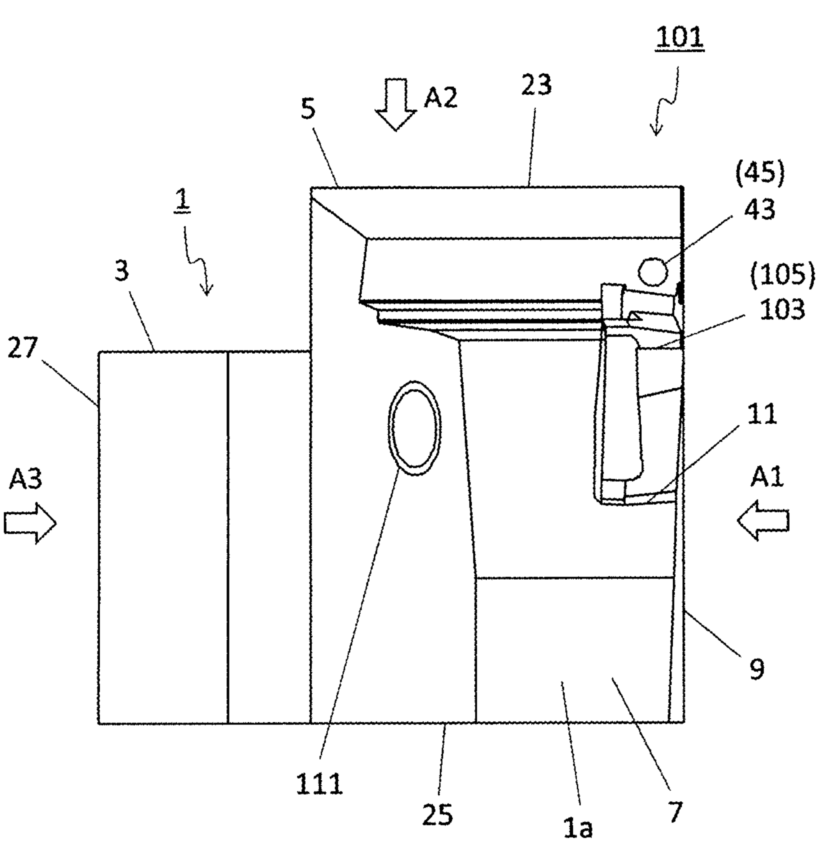
FIG. 2 is a plan view of the holder illustrated in FIG. 1 as viewed from a side of a first end.
Figure 3:
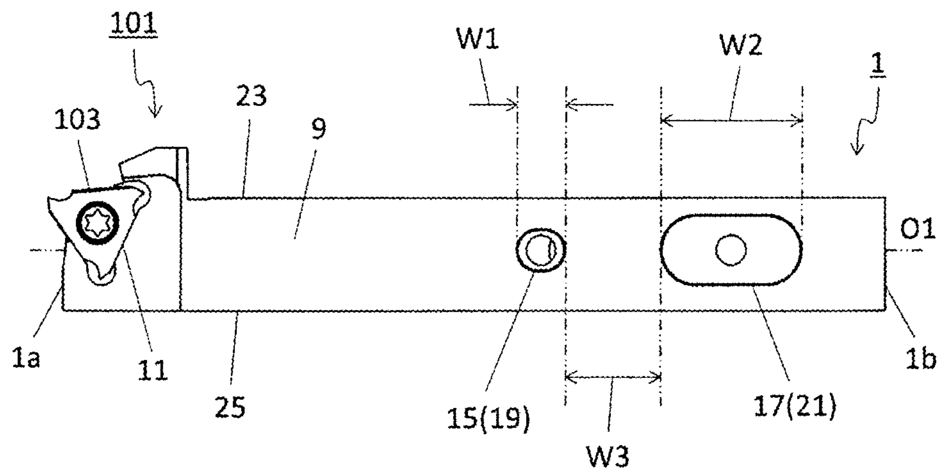
FIG. 3 is a plan view of the holder illustrated in FIG. 2 as viewed from A1 direction (a first lateral surface)
Figure 4:
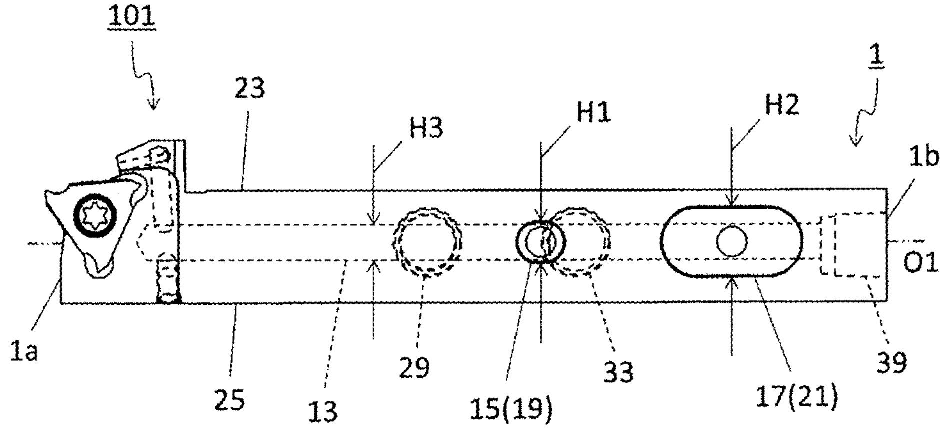
FIG. 4 is a diagram of the holder illustrated in FIG. 3 as viewed in a plan perspective.
Figure 5:
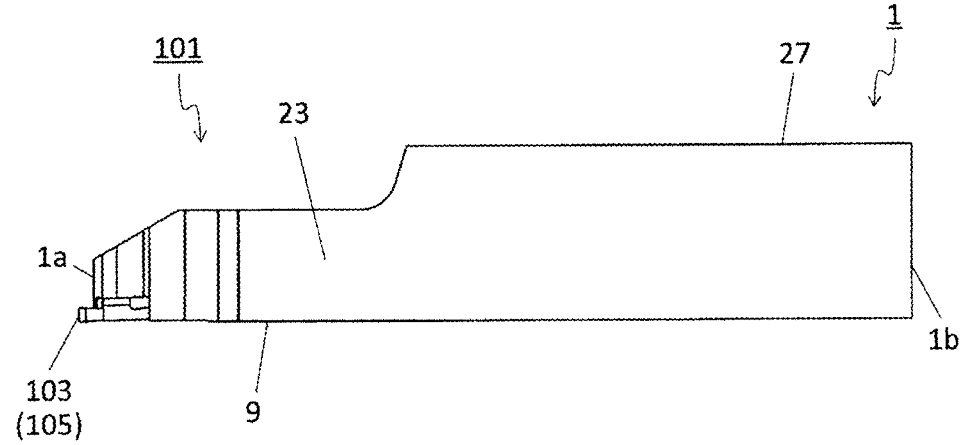
FIG. 5 is a plan view of the holder illustrated in FIG. 2 as viewed from A2 direction (an upper surface)
Figure 6:
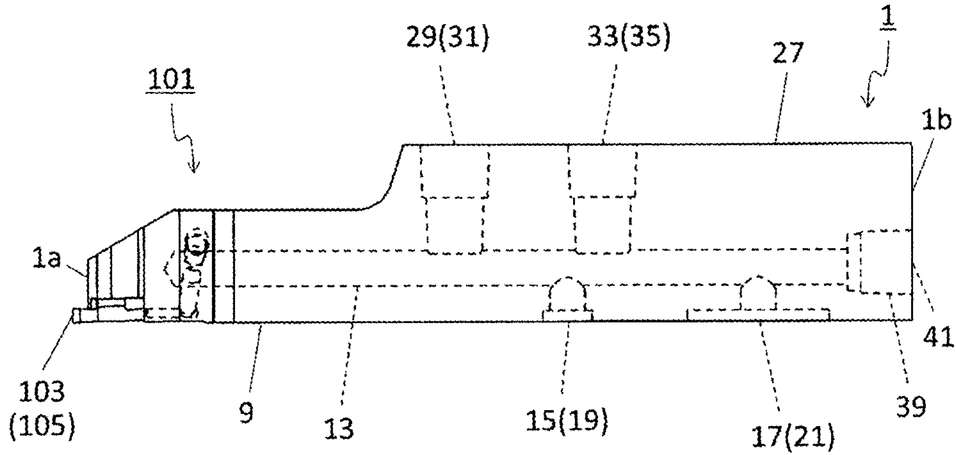
FIG. 6 is a diagram of the holder illustrated in FIG. 5 as viewed in a plan perspective.
Figure 7:
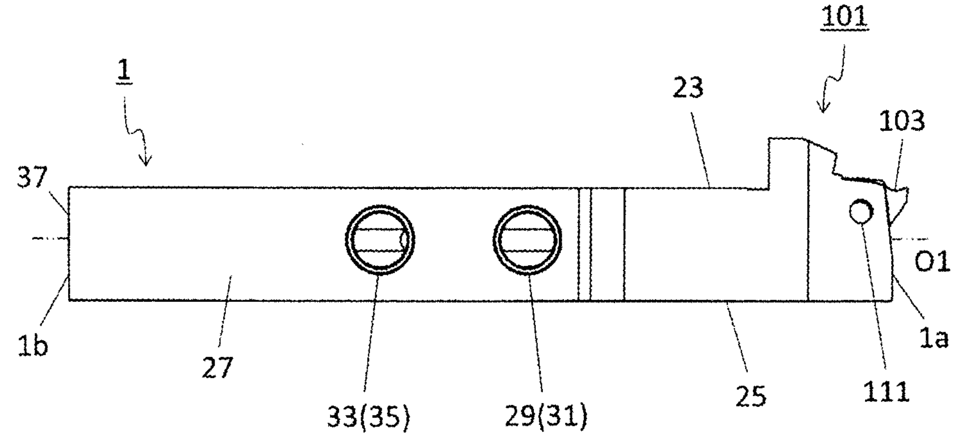
FIG. 7 is a plan view of the holder illustrated in FIG. 2 as viewed from A3 direction (a second lateral surface)
Figure 8:
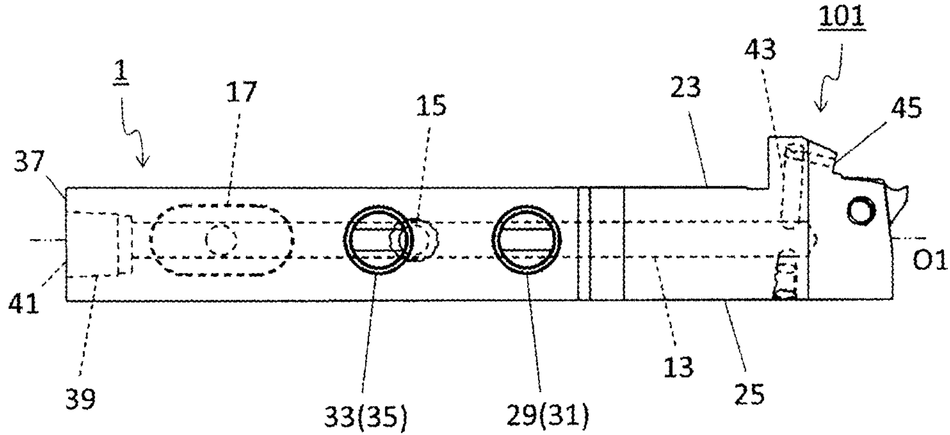
FIG. 8 is a diagram of the holder illustrated in FIG. 7 as viewed in a plan perspective.
Figure 9:
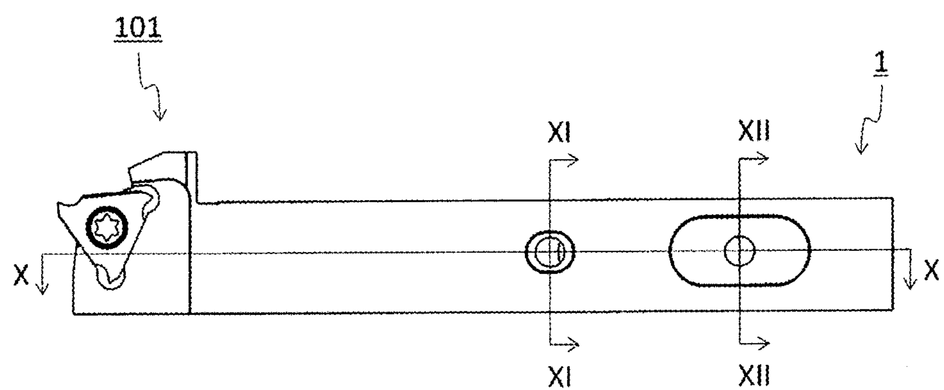
FIG. 9 is a side view that is identical to the holder illustrated in FIG. 3.

A holder 1 in a non-limiting embodiment of the present disclosure may be described in detail below with reference to the drawings. For the sake of description, each of the drawings referred to below may illustrate, in simplified form, only main members necessary for describing the embodiment. Hence, the holder 1 for a machining process may include any structural member not illustrated in the drawings referred to. Dimensions of the members in each of the drawings may be not be ones which faithfully represent dimensions of actual structural members and dimension ratios of these members. These points may also be true for a cutting tool and a method for manufacturing a machined product described later.

The holder 1 may have a bar shape extending from a first end 1*a* to a second end 1*b* along a central axis O1 as in the non-limiting embodiment illustrated in FIGS. 1 to 12. In general, the first end 1*a* may be called "a front end," and the second end 1*b* may be called "a rear end".

The holder 1 may have, for example, a polygonal prism shape. The holder 1 may have a quadrangular prism shape as in the non-limiting embodiment illustrated in FIG. 1. As used here, the term "polygonal prism shape" need not be a columnar shape having a strictly polygonal shape, but may include slight irregularities and curves.

Dimensions of the holder 1 may be suitably set according to dimensions of a workpiece. For example, a length of the holder 1 in a direction along the central axis O1 may be set to approximately 60-500 mm. A width (diameter) of the holder 1 in a direction orthogonal to the central axis O1 may be set to 6-250 mm. Examples of material of the holder 1 may include steel, cast iron and aluminum alloy.

The holder 1 may include a shank 3 and a head 5. The shank 3 can be held by a turret in a machine tool. The head 5 may be located on a side of the first end 1*a* with respect to the shank 3. The head 5 is capable of fixing a cutting insert.

The holder 1 may include a first end surface 7, a first lateral surface 9 and a pocket 11. The first end surface 7 may be located at the first end 1*a*. The first lateral surface 9 may extend from the first end surface 7 toward the second end 1*b*. The pocket 11 may open into the first end surface 7 and the first lateral surface 9. The pocket 11 may permit attachment of the cutting insert. The pocket 11 may be located in the head 5.

The holder 1 may include a main coolant hole 13, a first sub coolant hole 15 and a second sub coolant hole 17. The individual coolant holes may permit flow of a fluid (cooling fluid). The fluid flowing through the individual coolant holes may generally be called "coolant". Examples of the coolant may include water-insoluble coolant and water-soluble coolant. Examples of the water-insoluble coolant may include oil-based coolants, inert extreme pressure-based coolants and active extreme pressure-based coolants. Examples of the water-soluble coolant may include emulsion-type, soluble-type and solution-type coolants. The coolant may be gas, such as inert gas, instead of liquid. The coolant may be suitably selected according to material of a workpiece.

The main coolant hole 13 may extend from a side of the first end 1*a* toward a side of the second end 1*b*. The first sub coolant hole 15 may connect to the main coolant hole 13. The second sub coolant hole 17 may be located closer to the second end 1*b* than the first sub coolant hole 15, and may connect to the main coolant hole 13.

The first sub coolant hole 15 may include a first opening 19. The first opening 19 may open into the first lateral surface 9. The first opening 19 may open into the first lateral surface 9 in the shank 3. The second sub coolant hole 17 may include a second opening 21. The second opening 21 may open into the first lateral surface 9. The second opening 21 may open into the first lateral surface 9 in the shank 3.

The first opening 19 and the second opening 21 are connectable to an opening of the flow path in the turret. The first opening 19 and the second opening 21 are also servable as an inflow port through which the fluid flows into the first sub coolant hole 15 and the second sub coolant hole 17. Therefore, in cases where the first sub coolant hole 15 includes the first opening 19 and the second sub coolant hole 17 includes the second opening 21, the fluid supplied from the interior of the turret is flowable through the first opening 19 or the second opening 21 into the interior of the main coolant hole 13. It may also be possible to select either the first opening 19 or the second opening 21 according to machining conditions.

One of the first opening 19 and the second opening 21 which is not used may be closed by a seal member in order to avoid leakage of the fluid. Examples of the seal member may include solder, resin and a screw member. This may also be true for other openings.

A width W1 of the first opening 19 in a direction along the central axis O1 may be identical to or different from a width W2 of the second opening 21 in the direction along the central axis O1. For example, the width W1 may be smaller than the width W2 as in a non-limiting embodiment illustrated in FIG. 3.

In other words, the width W2 may be larger than the width W1 in the non-limiting embodiment. If the second opening 21 is used as the inflow port for the fluid, a stable flow of the fluid into the second opening 21 may be maintained even if the projection amount of the holder 1 is changed by an amount of approximately the width W2. That is, the holder 1 have a high degree of freedom for the projection amount.

If the second opening 21 is used as the inflow port for the fluid, the first opening 19 can be located closer to the first end 1*a* than the turret. If the first opening 19 connects to the second opening 21, in other words, if including only one opening, it may be difficult to avoid the leakage of the fluid in the second opening 21 in cases where the projection amount is increased to such a degree that the first opening 19 is located closer to the first end 1*a* than the turret. However, if the first opening 19 is located away from the second opening 21, the leakage of the fluid in the second opening 21 is avoidable even if the projection amount is increased to such a degree that the first opening 19 is located closer to the first end 1*a* than the turret.

Additionally, if the projection amount is increased to such a degree that the first opening 19 is located closer to the first end 1*a* than the turret, durability of the holder 1 may deteriorate at the first opening 19. However, if the width W1 is smaller than the width W2, a region of the holder 1 subjected to durability deterioration becomes smaller. Therefore, the durability deterioration of the holder 1 is reducible.

Even if a slight positional shift occurs when attaching the holder to the turret, a region of the first sub coolant hole 15 where a cross-sectional area of the flow path becomes narrow may be less likely to occur, thereby facilitating a stable supply of the coolant. The holder 1 may therefore offer a high degree of freedom for design of the projection amount while supplying the fluid to the holder 1.

The width W2 of the second opening 21 in the direction along the central axis O1 may be identical to or different from an interval W3 between the first opening 19 and the second opening 21. For example, the width W2 may be larger than the interval W3 as in the non-limiting embodiment illustrated in FIG. 3. This may lead to a high degree of freedom for the projection amount if the second opening 21 is used as the inflow port for the fluid.

The width W1 of the first opening 19 in the direction along the central axis O1 may be identical to or different from the interval W3 between the first opening 19 and the second opening 21. For example, the width W1 may be smaller than the interval W3 as in the non-limiting embodiment illustrated in FIG. 3. In other words, the interval W3 may be larger than the width W1. This configuration may contribute to maintaining a large interval W3 of a region where the first opening 19 and the second opening 21 are located and which tends to have relatively low durability. It may therefore be easy to avoid a significant deterioration of the durability of the holder 1 even if including the first opening 19 and the second opening 21.

The width W1 of the first opening 19, the width W2 of the second opening 21, and the interval W3 between the first opening 19 and the second opening 21 are not limited to a specific value. For example, the width W1 may be set to approximately 2-20 mm. The width W2 may be set to approximately 2-20 mm. The interval W3 may be set to approximately 1-25 mm.

The holder 1 may further include an upper surface 23 and a lower surface 25. The upper surface 23 may extend from the first end surface 7 toward the second end 1*b*, and may connect to the first lateral surface 9. The lower surface 25 may be located on a side opposite to the upper surface 23, and may connect to the first lateral surface 9. As used here, the upper surface 23 and the lower surface 25 may be terms for the sake of convenience, and may not be ones which indicate upper and lower directions. For example, the upper surface 23 need not be directed upward when using the holder 1.

A width H1 of the first opening 19 in a vertical direction from the upper surface 23 toward the lower surface 25 may be identical to or different from a width H2 of the second opening 21 in the vertical direction. For example, the width H1 may be smaller than the width H2 as in the non-limiting embodiment illustrated in FIG. 4. In other words, the width H2 may be larger than the width H1 in the above non-limiting embodiment. This may lead to a high degree of freedom for position of an outflow port for the fluid with respect to the second opening 21 in the turret. Additionally, if the width H1 is smaller than the width H2, the durability of the holder 1 may be less likely to deteriorate even if the first opening 19 is located closer to the first end 1*a* than the turret.

The width H1 of the first opening 19 in the vertical direction may be identical to or different from a width H3 of the main coolant hole 13 in the vertical direction. For example, the width H1 may be larger than the width H3 as in the non-limiting embodiment illustrated in FIG. 4. With this configuration, even if a slight positional shift occurs when attaching the holder to the turret, the region of the first sub coolant hole 15 where the cross-sectional area of the flow path becomes narrow may be less likely to occur, thereby facilitating a stable supply of the coolant.

The width H1 of the first opening 19, the width H2 of the second opening 21, and the width H3 of the main coolant hole 13 are not limited to a specific value. For example, the width H1 may be set to approximately 2-24 mm. The width H2 may be set to approximately 2-24 mm. The width H3 may be set to approximately 2-20 mm.

The holder 1 may further include a second lateral surface 27 and a third sub coolant hole 29. The second lateral surface 27 may be located on a side opposite to the first lateral surface 9. The third sub coolant hole 29 may open into the second lateral surface 27. In other words, the third sub coolant hole 29 may include a third opening 31 that opens into the second lateral surface 27. The third sub coolant hole 29 may open into the second lateral surface 27 in the shank 3. The third sub coolant hole 29 may connect to the main coolant hole 13.

The third opening 31 of the third sub coolant hole 29 is connectable to a hose located outside of the turret, and through which the fluid is supplied. In other words, the third opening 31 is servable as a connection port connected to the hose. The third opening 31 is also servable as an inflow port that permits a flow of the fluid into the third sub coolant hole 29. Therefore, if the holder 1 includes the third sub coolant hole 29, it may be possible to allow the fluid supplied from the outside of the turret to flow through the third opening 31 into the main coolant hole 13.

A length L1 of the first sub coolant hole 15 may be identical to or different from a length L2 of the second sub coolant hole 17. An inner diameter D1 of the first sub coolant hole 15 may be identical to or different from an inner diameter D2 of the second sub coolant hole 17. For example, the length L1 may be identical to the length L2, and the inner diameter D1 may be identical to the inner diameter D2 as in the non-limiting embodiment illustrated in FIG. 10. A dimensional relationship between the inner diameters may be evaluated by comparing minimum values of the inner diameters.

The length L1 of the first sub coolant hole 15 may be identical to or different from a length L3 of the third sub coolant hole 29. The inner diameter D1 of the first sub coolant hole 15 may be identical to or different from an inner diameter D3 of the third sub coolant hole 29.

Figure 10:
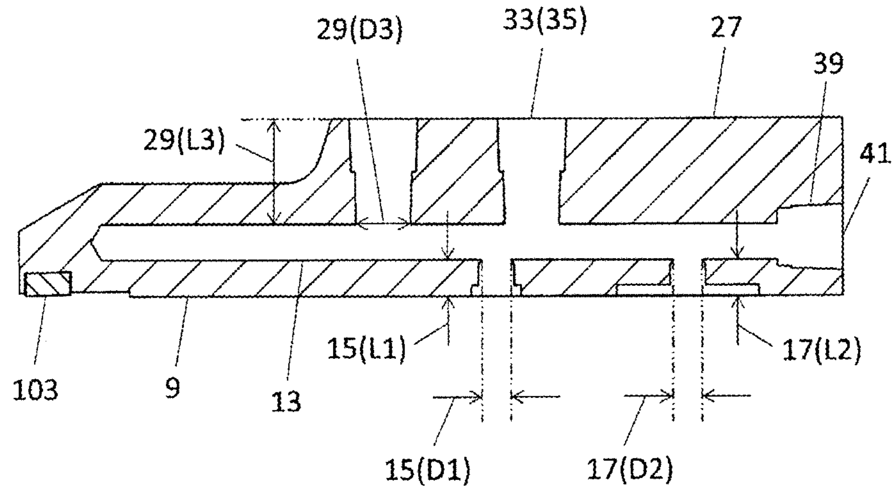
FIG. 10 is a sectional view taken along line X-X in the holder illustrated in FIG. 9.
Figure 11:
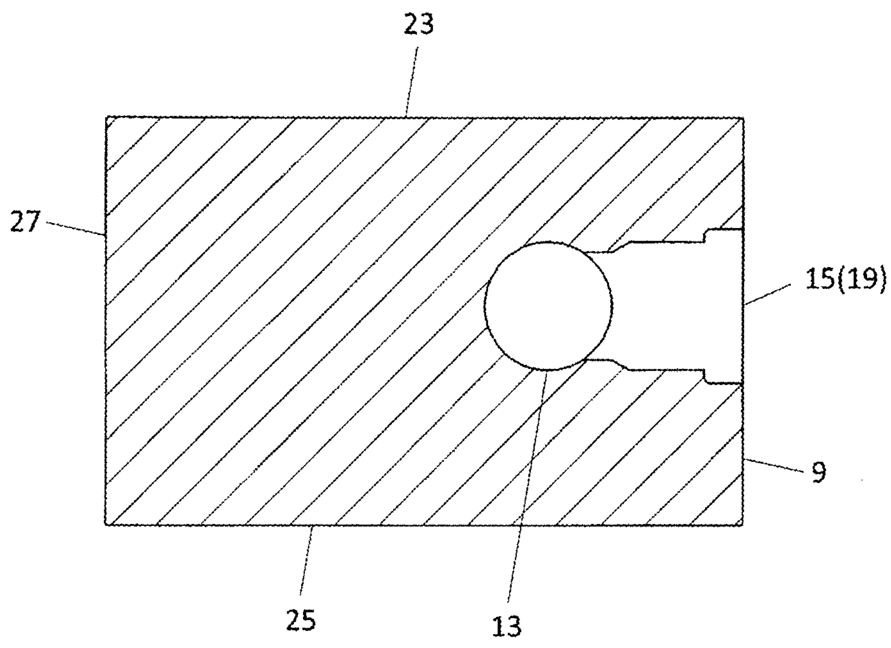
FIG. 11 is a sectional view taken along line XI-XI in the holder illustrated in FIG. 9.
Figure 12:
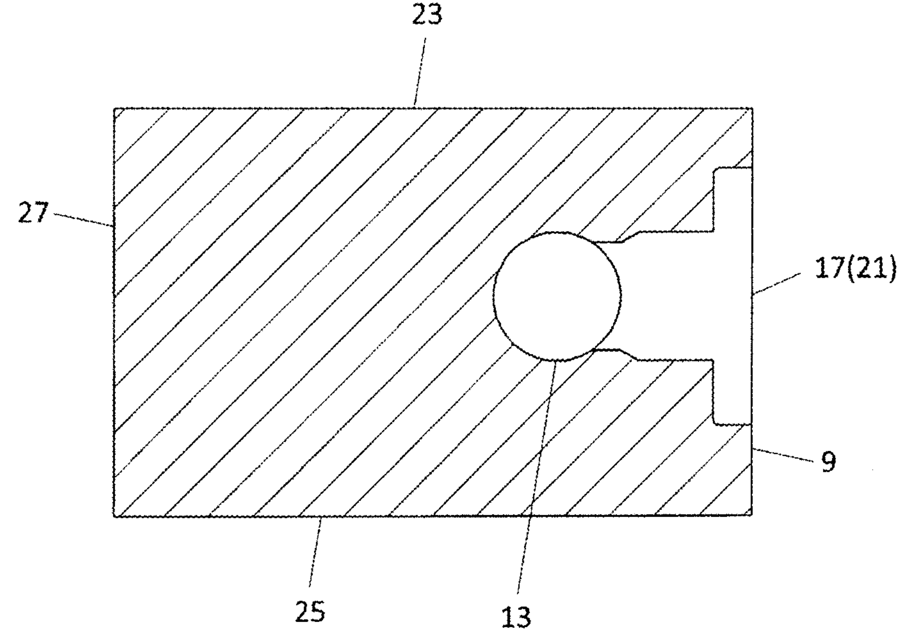
FIG. 12 is a sectional view taken along line XII-XII in the holder illustrated in FIG. 9.

For example, the length L1 may be smaller than the length L3, and the inner diameter D1 may be smaller than the inner diameter D3 as in the non-limiting embodiment illustrated in FIG. 10. If the inner diameter D3 is larger than the inner diameter D1, a flow path loss in the third sub coolant hole 29 may tend to be smaller than that in the first sub coolant hole 15. If the length L1 is smaller than the length L3, the flow path loss in the first sub coolant hole 15 may tend to be smaller than that in the third sub coolant hole 29. Therefore, in cases where the length L1 is smaller than the length L3 and the inner diameter D1 is smaller than the inner diameter D3, the first sub coolant hole 15 and the third sub coolant hole 29 are less susceptible to variations in flow path loss.

The length L1 of the first sub coolant hole 15, the length L2 of the second sub coolant hole 17, and the length L3 of the third sub coolant hole 29 are not limited to a specific value. For example, the length L1 may be set to approximately 0.8-31 mm. The length L2 may be set to approximately 0.8-31 mm. The length L3 may be set to approximately 2-33 mm.

The inner diameter D1 of the first sub coolant hole the inner diameter D2 of the second sub coolant hole 17, and the inner diameter D3 of the third sub coolant hole 29 are not limited to a specific value. For example, the inner diameter D1 may be set to approximately 1.6-23 mm. The inner diameter D2 may be set to approximately 1.6-23 mm. The inner diameter D3 may be set to approximately 6-18 mm.

The holder 1 may further include a fourth sub coolant hole 33. The fourth sub coolant hole 33 may be located closer to the second end 1*b* than the third sub coolant hole 29. The fourth sub coolant hole 33 may open into the second lateral surface 27. In other words, the fourth sub coolant hole 33 may include a fourth opening that opens into the second lateral surface 27. The fourth sub coolant hole 33 may open into the second lateral surface 27 in the shank 3. The fourth sub coolant hole 33 may connect to the main coolant hole 13. The fourth opening 35 of the fourth sub coolant hole 33 is connectable to the hose.

The holder 1 may further include a second end surface 37 and a fifth sub coolant hole 39. The second end surface 37 may be located on the second end 1*b*. The fifth sub coolant hole 39 may open into the second end surface 37. In other words, the fifth sub coolant hole 39 may include a fifth opening 41 that opens into the second end surface 37. The fifth sub coolant hole 39 may connect to the main coolant hole 13. The fifth sub coolant hole 39 may connect to the main coolant hole 13. The fifth opening 41 of the fifth sub coolant hole 39 is connectable to the hose.

The individual coolant holes may be formed by a drilling process using, for example, a drill. The individual coolant holes may have, for example, a circular shape, an elliptical shape or a polygonal shape in a cross section orthogonal to a flow direction of the fluid.

The holder 1 may include a flow path 43 that is located closer to the first end 1*a* than the first sub coolant hole 15 and connects to the main coolant hole 13. The flow path 43 may include an outflow port 45 that opens into a side of the first end 1*a*. For example, the outflow port 45 may open into the head 5 as in the non-limiting embodiment illustrated in FIG. 1. The outflow port 45 is servable as a portion that allows the fluid to flow out toward the first end 1*a*. The position of the outflow port 45 is not limited to a specific location. There may be one or a plurality of the outflow ports 45.

The flow path 43 may be formed by a drilling process using, for example, a drill. A part of holes formed by the drilling process which does not serve as the flow path 43 may be closed by a seal member in order to avoid leakage of the fluid.

Then, a holder 1A in a non-limiting embodiment of the present disclosure may be described with reference to FIG. 13. The following description of the holder 1A may be focused mainly on differences from the holder 1, and a detailed description of configurations similar to those of the holder 1 may be omitted. This may also be true for a holder 1B described later.

Figure 13:
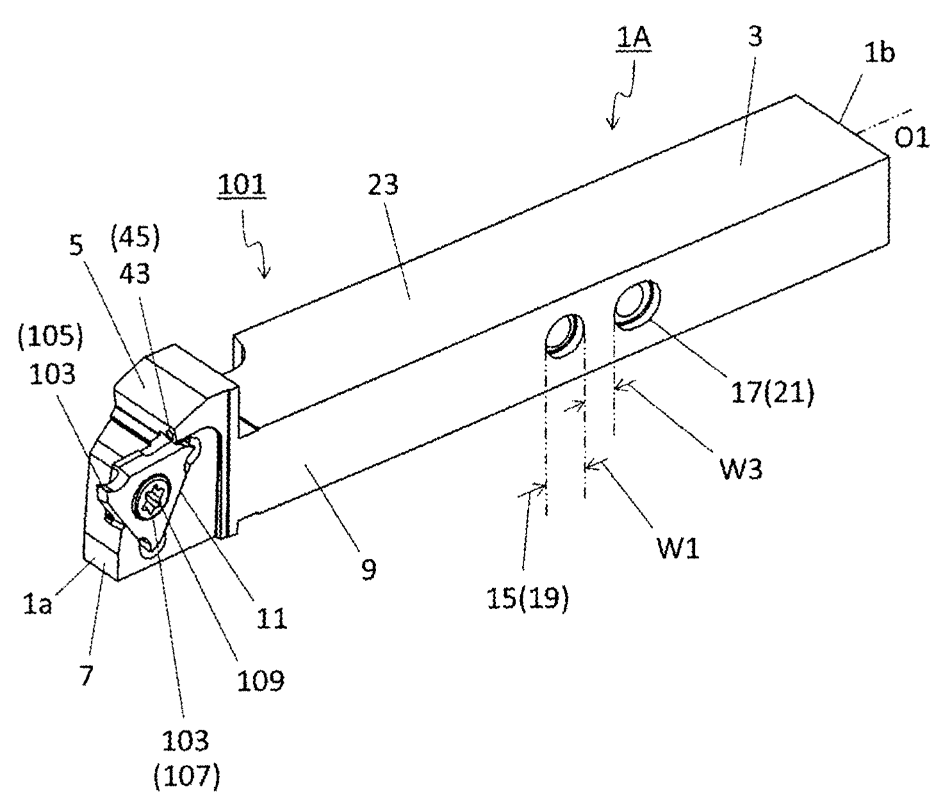
FIG. 13 is a perspective view illustrating a holder (cutting tool) in a non-limiting embodiment of the present disclosure.

As in the non-limiting embodiment illustrated in FIG. 13, the width W1 of the first opening 19 in the direction along the central axis O1 may be larger than the interval W3 between the first opening 19 and the second opening 21 in the holder 1A. This may lead to a high degree of freedom for the projection amount of the holder 1 if the second opening 21 is used as an inflow port for the fluid.

Even if a slight positional shift occurs when attaching the holder to the turret, a region of the first sub coolant hole 15 where a cross-sectional area of the flow path becomes narrow may be less likely to occur, thereby facilitating a stable supply of the coolant.

Then, the holder 1B in a non-limiting embodiment of the present disclosure may be described with reference to FIG. 14.

Figure 14:
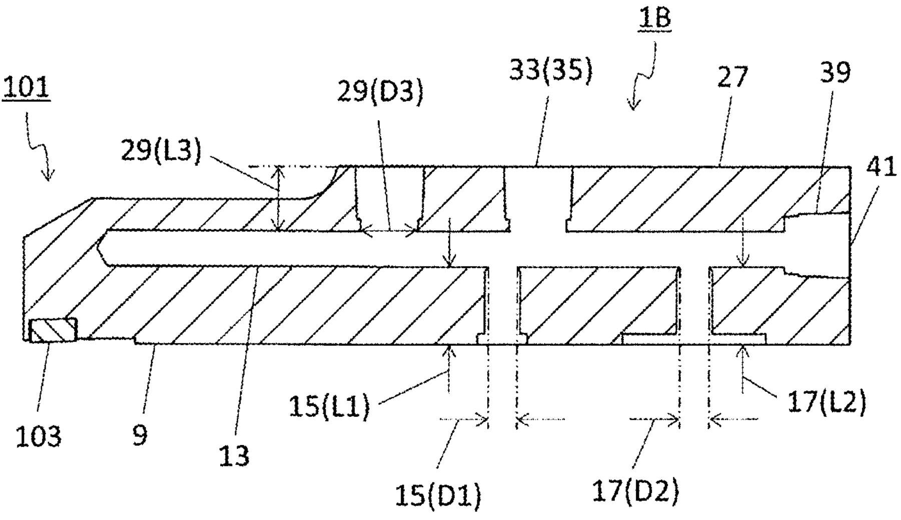
FIG. 14 is a sectional view illustrating a holder (cutting tool) in a non-limiting embodiment of the present disclosure, which is a diagram corresponding to FIG. 10.

As in the non-limiting embodiment illustrated in FIG. 14, the length L1 of the first sub coolant hole 15 may be larger than the length L3 of the third sub coolant hole 29, and the inner diameter D1 of the first sub coolant hole 15 may be smaller than the inner diameter D3 of the third sub coolant hole 29 in the holder 1B.

In the non-limiting embodiment illustrated in FIG. 14, the pocket 11 may open into the first end surface 7 and the first lateral surface 9 as described above, and the cutting insert is attachable to the pocket 11. Consequently, a side of the first lateral surface 9 is susceptible to a larger cutting load generated during a machining process than a side of the second lateral surface 27. However, if the length L1 of the first sub coolant hole 15 is larger than the length L3 of the third sub coolant hole 29, the side of the first lateral surface 9 may have high durability. Therefore, the durability of the holder 1B can be enhanced as a whole.

Cutting Tool

A cutting tool 101 in a non-limiting embodiment may be described in detail below by exemplifying the case of including the holder 1 described above with reference to FIGS. 1 to 12.

The cutting tool 101 may include the holder 1 and a cutting insert 103 (hereinafter also referred to as “the insert 103” in some cases) located in the pocket 11 of the holder 1 as in the non-limiting embodiment illustrated in FIGS. 1 to 12. If the cutting tool 101 includes the holder 1, a high degree of freedom for setting of the projection amount may be maintained while supplying the fluid to the holder 1. Therefore, the cutting tool is capable of offering excellent machining performance.

The insert 103 may have a polygonal plate shape as in the non-limiting embodiment illustrated in FIG. 1. The insert 103 may include a cutting edge 105. The insert 103 may be located in the pocket 11 so that the cutting edge 105 can protrude outwards on a side of the first end 1*a* of the holder 1. The cutting tool 101 is capable of carrying out a machining process by bringing the cutting edge 105 into contact with a workpiece.

The insert 103 may further include a through hole 107. The cutting tool 101 may further include a fixing member 109. The fixing member 109 may be a member for fixing the insert 103 to the holder 1. The fixing member 109 may be a screw. The fixing member 109 may be, for example, a clamping member instead of the screw.

The holder 1 may include a screw hole 111 at a position corresponding to the through hole 107 in the pocket 11. The insert 103 is fixable to the holder 1 by inserting the screw that is the fixing member 109 into the through hole 107 of the insert 103, and by fitting the screw into the screw hole 111 of the holder 1. The through hole 107 and the screw hole 111 may extend in a direction orthogonal to the central axis O1.

Examples of material of the insert 103 may include cemented carbide and cermet. Examples of composition of the cemented carbide may include WC—Co, WC—TiC—Co and WC—TiC—TaC—Co. Here, WC, TiC and TaC may be hard particles, and Co may be a binding phase.

The cermet may be a sintered composite material obtainable by compositing metal into a ceramic ingredient. Examples of the cermet may include a titanium compound composed mainly of titanium carbide (TiC) or titanium nitride (TiN). It is indisputable that the material of the insert 103 is not limited to the above composition.

Although the cutting tool 101 includes the holder 1 in the non-limiting embodiment illustrated in FIG. 1 and the like, it is not intended to limit thereto. For example, the cutting tool 101 may include the holder 1A or the holder 1B.

Method for Manufacturing Machined Product

A method for manufacturing a machined product 203 in a non-limiting embodiment of the present disclosure may be described in detail below with reference to FIGS. 15 to 17 by exemplifying the case of using the above cutting tool 101.

The machined product 203 may be manufactured by carrying out a machining process of a workpiece 201. The method for manufacturing the machined product 203 may include the following steps:

(1) rotating the workpiece 201;

(2) bringing the cutting tool 101 into contact with the workpiece 201 being rotated; and (3) moving the cutting tool 101 away from the workpiece 201.

Figure 15:
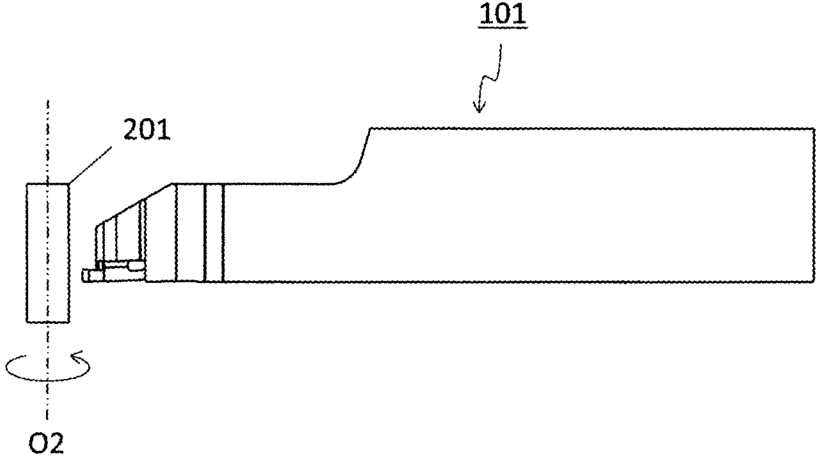
FIG. 15 is a schematic diagram illustrating one of steps in a method for manufacturing a machined product in a non-limiting embodiment of the present disclosure.

Specifically, as in the non-limiting embodiment illustrated in FIG. 15, firstly, the workpiece 201 may be rotated around an axis O2, and the cutting tool 101 may be relatively brought near the workpiece 201. Then, as in the non-limiting embodiment illustrated in FIG. 16, the workpiece 201 may be cut out by bringing the cutting edge 105 of the insert 103 in the cutting tool 101 into contact with the workpiece 201.

Figure 17:
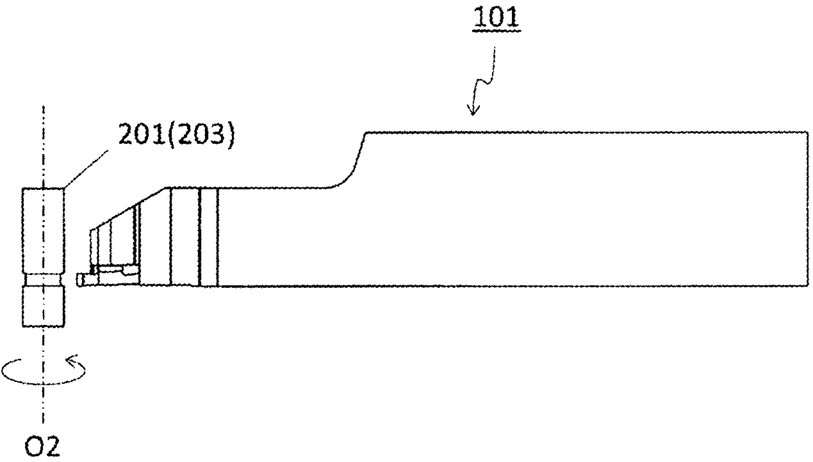
FIG. 17 is a schematic diagram illustrating one of the steps in the method for manufacturing a machined product in the non-limiting embodiment of the present disclosure.

Thereafter, as in the non-limiting embodiment illustrated in FIG. 17, the cutting tool 101 may be relatively moved away from the workpiece 201.

If the cutting tool 101 including the holder 1 is used in the method for manufacturing the machined product 203, the high degree of freedom for setting the projection amount may be maintained while supplying the fluid to the holder 1. It may therefore be possible to cut out the workpiece 201 with excellent machining precision, thereby obtaining the machined product 203 having a highly precise machined surface.

Figure 16:
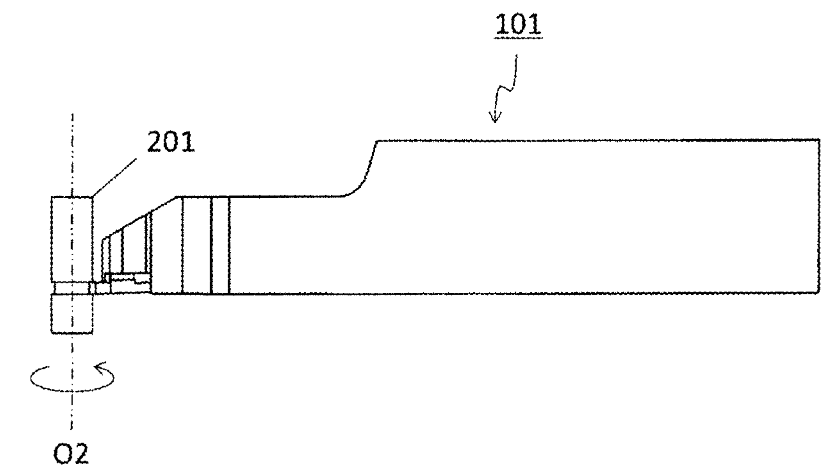
FIG. 16 is a schematic diagram illustrating one of the steps in the method for manufacturing a machined product in the non-limiting embodiment of the present disclosure.

Although the workpiece 201 is fixed and the cutting tool 101 is moved in the individual steps in the non-limiting embodiment illustrated in FIGS. 15 to 17, there is no intention to limit to this embodiment.

For example, the workpiece 201 may be brought near the cutting tool 101 in the step (1). Similarly, the workpiece 201 may be moved away from the cutting tool 101 in the step (3). If it is desired to continue the machining process, the step of bringing the cutting edge 105 of the insert 103 into contact with different portions of the workpiece 201 may be repeated, while the workpiece 201 is kept rotating.

Examples of material of the workpiece 201 may include carbon steel, alloy steel, stainless steel, cast iron and non-ferrous metals.

Although the cutting tool 101 including the holder 1 is used in the non-limiting embodiment illustrated in FIGS. 15 to 17, it is not intended to limit thereto. The cutting tool 101 including, for example, the holder 1A or the holder 1B may be used.

The invention claimed is:

1. A holder, having a bar shape extending from a first end to a second end along a central axis and the holder comprising:

a first end surface located on the first end;

a first lateral surface extending from the first end surface toward the second end;

a pocket which opens into the first end surface and the first lateral surface and which permits attachment of a cutting insert;

a main coolant hole extending from a side of the first end toward a side of the second end;

a first sub coolant hole connected to the main coolant hole; and a second sub coolant hole which is located closer to the second end than the first sub coolant hole, the second sub coolant hole connected to the main coolant hole to which the first sub coolant hole is connected, wherein the first sub coolant hole comprises a first opening that opens into the first lateral surface, the second sub coolant hole comprises a second opening that opens into the first lateral surface, a width of the first opening in a direction along the central axis is smaller than a width of the second opening in the direction along the central axis, and the width of the second opening in the direction along the central axis is larger than an interval between the first opening and the second opening.

2. The holder according to claim 1, wherein the width of the first opening in the direction along the central axis is smaller than the interval between the first opening and the second opening.

3. The holder according to claim 1, further comprising:

an upper surface extending from the first end surface toward the second end and connected to the first lateral surface; and a lower surface being located on a side opposite to the upper surface and connected to the first lateral surface, wherein a width of the first opening in a vertical direction from the upper surface toward the lower surface is smaller than a width of the second opening in the vertical direction.

4. The holder according to claim 3, wherein the width of the first opening in the vertical direction is larger than a width of the main coolant hole in the vertical direction.

5. The holder according to claim 1, further comprising:

a second lateral surface located on a side opposite to the first lateral surface; and a third sub coolant hole opening into the second lateral surface and connected to the main coolant hole.

6. The holder according to claim 5, wherein a length of the first sub coolant hole in a direction orthogonal to the direction along the central axis is smaller than a length of the third sub coolant hole in the direction orthogonal to the direction along the central axis, and an inner diameter of the first sub coolant hole is smaller than an inner diameter of the third sub coolant hole.

7. The holder according to claim 5, wherein a length of the first sub coolant hole in a direction orthogonal to the direction along the central axis is larger than a length of the third sub coolant hole in the direction orthogonal to the direction along the central axis, and an inner diameter of the first sub coolant hole is smaller than an inner diameter of the third sub coolant hole.

8. A cutting tool, comprising:

the holder according to claim 1; and a cutting insert located in the pocket of the holder.

9. A method for manufacturing a machined product, the method comprising:

rotating a workpiece;

bringing the cutting tool according to claim 8 into contact with the workpiece being rotated; and moving the cutting tool away from the workpiece.

10. The holder according to claim 1, wherein the main coolant hole connects the first sub coolant hole and the second sub coolant hole.

11. The holder according to claim 1, wherein an inner diameter of the first opening is larger than an inner diameter of the first sub coolant hole.

12. The holder according to claim 1, wherein an inner diameter of the second opening is larger than an inner diameter of the second sub coolant hole.

13. The holder according to claim 1, wherein the first opening is configured to serve as an inflow port through which fluid flows into the first sub coolant hole.

14. The holder according to claim 1, wherein the second opening is configured to serve as an inflow port through which fluid flows into the second sub coolant hole.

* * * * *